April 16, 1935.   F. E. JENNY   1,998,195
CULTIVATOR
Filed April 15, 1932   2 Sheets-Sheet 1

TYPE "A"

TYPE "B"

INVENTOR
F. E. Jenny

April 16, 1935.   F. E. JENNY   1,998,195
CULTIVATOR
Filed April 15, 1932   2 Sheets-Sheet 2

TYPE "C"

TYPE "D"

INVENTOR
F. E. Jenny

Patented Apr. 16, 1935

1,998,195

UNITED STATES PATENT OFFICE 1,998,195

CULTIVATOR

Fred E. Jenny, Dumont, N. J.

Application April 15, 1932, Serial No. 605,448

9 Claims. (Cl. 97—58)

This invention relates to cultivators and more especially to the tooth type, having novel teeth of special form.

One of the objects of my invention is to stamp out of one or more pieces of metal a cultivating implement, having a special form, designed to thoroughly stir the soil for its entire width and the full depth of the teeth.

A further object is to provide a soil working implement wherein the flat part of the teeth is substantially parallel to the working direction of the tool.

Another object is to form the shape of the teeth beginning directly at the frame of the tool.

A still further object is to stamp one or two teeth out of one flat piece of sheet metal or metal ribbon and forming the teeth in one operation.

Another object is to have the flat side of the teeth substantially parallel with the working direction of the tool, but having the bottom portion bent sideways to form a hoe like cutting blade.

Another object is to arrange cultivator teeth on a tool in tandem formation where the follower tooth shall be longer than the leading tooth so as to work the depth of the soil in stages, rather than in one operation.

These and other objects of the invention will be more manifest from the following specification and drawings and as specifically set forth in the claims.

Figure 1A:
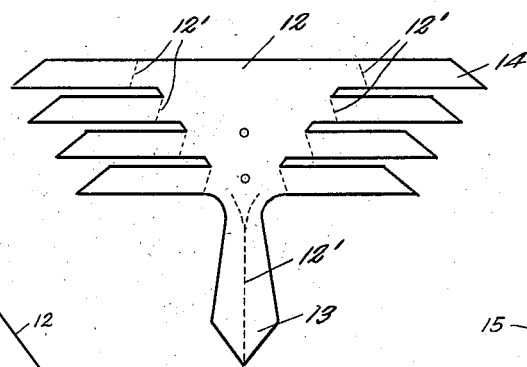
Fig. 1a, shows the shape of the metal from which a cultivator, Fig. 1, may be pressed.
Figure 1:
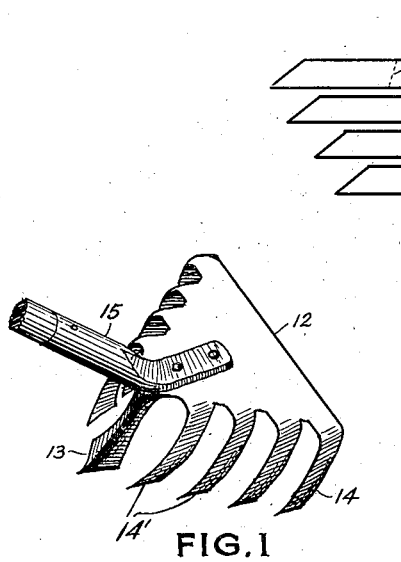
Fig. 1 is a perspective view of a cultivator, called type "A", showing its general construction.
Figure 2:
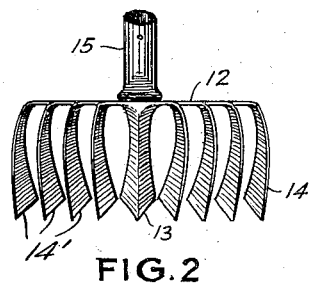
Fig. 2 shows a front view of type "A".
Figure 3:
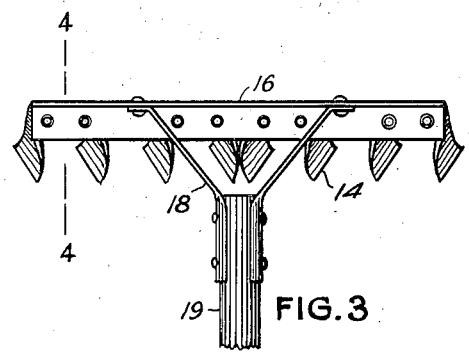
Fig. 3 is a plan view of a modification of the cultivator shown in Fig. 1 and is called type "B".
Figure 5:
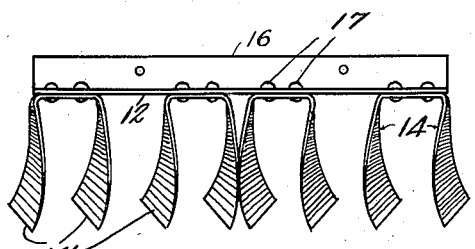
Fig. 5 is a front view of type "B".
Figure 4:
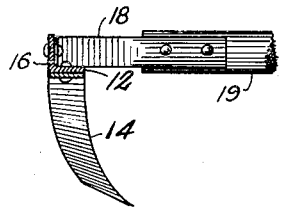
Fig. 4 is a section along 4—4 on Fig. 3.
Figure 6:
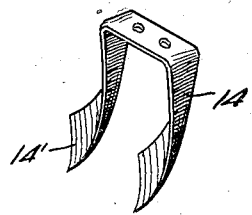
Fig 6 is a perspective view showing two teeth stamped out of one piece of metal, as indicated on type "B" cultivator.

Referring to Figs. 1, 1a and 2 of the drawings, there is shown a novel form of cultivator implement constructed and arranged in accordance with the present invention. In this particular embodiment of the invention, a triangular shaped flat metal frame 12 is provided with an integrally formed angular shaped leader tooth 13 and associated follower teeth 14 located at the diverging sides of the frame. The teeth 14 are formed from substantially rectangular shaped flat metal blanks so that the lateral edges at the frame shall be substantially in a plane parallel to the working direction of the implement and the individual tooth so as to provide maximum strength for the tooth. The lower portion of each tooth is gradually twisted to a position substantially transverse to the upper portion so as to provide a tooth having a variable soil working surface throughout the entire length or depth thereof. In this particular arrangement, the tooth is twisted so that a bottom edge 14', including the point and the heal of the tooth blade, lies substantially in the vertical plane of the upper portion of the tooth at the frame.

Another feature of the invention is the economical manner in which the implement may be manufactured. This particular type of implement is made by stamping, pressing or otherwise forming the frame and teeth from a single blank of flat or sheet metal. A blank cut to form the implement shown in Figs. 1 and 2 is shown in Fig. 1a wherein the frame member 12 is provided with integral spaced projections 14. In the process of making the implement, these projections are bent downwardly on dotted lines 12' to form the designated flat metal teeth, and the angular shaped leader tooth. It will be noted that the indicated lines of bend for the formation of the teeth are all substantially parallel to the working direction of the implement and teeth formed on these lines possess maximum strength at the frame connection. A handle 15 is mounted on the frame 12 for operating the implement.

Figures 3, 4, 5 and 6, indicate type "B", wherein the flat metal frame 12 is provided with a struck up rib 16. In this particular embodiment of the invention, the teeth constructed in accordance with the invention are secured to the underside of the frame in any suitable manner, by bolts or rivets for example, indicated by the numeral 17. The form of these teeth is the same and they may be stamped from a metal blank singly or in pairs. The implement is operated by a handle 19 connected to the frame by means of rivets or bolts engaging the rib 16, and positioned at right angles to the teeth. This construction provides an implement which may be used as a cultivator or harrow with equal facility. Regardless of the type of frame, teeth constructed in accordance with the present invention may be used with any desired type of frame for a particular kind of a cultivator.

Figure 7:
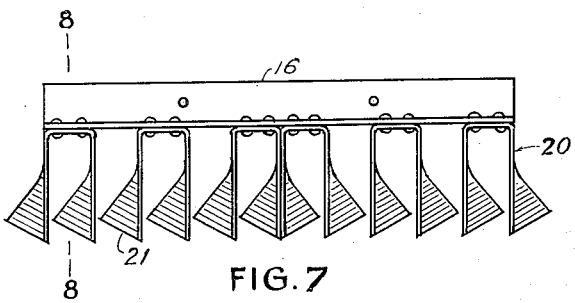
Fig. 7 is a front view of a modification of the invention and is called type "C".
Figure 8:
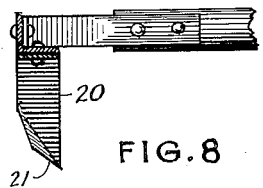
Fig. 8 is a section along 8—8 on Fig. 7.
Figure 9:
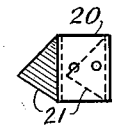
Fig. 9 is a top view of a pair of teeth used in type "C".

Figures 7, 8 and 9, type "C", are similar in construction to type "B", except that the teeth 20 are bent near the bottom as indicated, forming a flat cutting edge at 21. This cutting edge is in a skewed position with reference to the working direction of the tool and at the same time is upwardly and backwardly inclined which causes said cutting edge to be self sharpening.

Type "C" is particularly efficient for simultaneously weeding and raking fine gravel paths and driveways. It is designed to catch every weed in its path and leave no marks behind as is the case with ordinary rakes.

Figure 10:
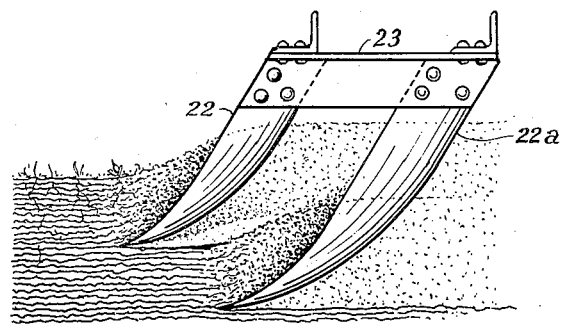
Fig. 10 is a side view of another modification of the invention, called type "D".

Figure 10, type "D", shows another modification of type "B", wherein the teeth 22 and 22a are of similar shape as described in type "B", except that the tops of the teeth remain straight and are fastened vertically to a frame 23. The follower tooth 22a, is longer than the leading tooth 22.

Figure 11:
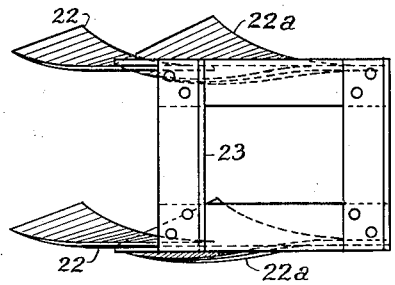
Fig. 11 is a plan view of type "D".

Figure 11 is a plan view of type "D", with an angle iron frame 23 and teeth 22 and 22a. This type of soil implement is designed to cultivate the ground to a greater depth with minimum resistance.

Although all four types of soil working devices, as herein described, are intended to be hand tools, types "A", "B" and "D" are equally adaptable in single or multiple units, or combinations thereof, for larger sizes to be propelled by horses or tractors.

In this case, however, type "A" would have a triangular shaped frame of angle iron or other suitable construction, with the teeth mounted singly on the underside of said frame.

This invention is not limited to any specific form of arrangement of parts or units, as indicated, but is intended to cover this specific type of tool in general.

What I claim as new and desire to secure by Letters Patent is:

1. As a new article of manufacture, a flat metal tooth for a cultivator implement comprising, a substantially rectangular shaped body portion, the lateral edges of the top portion being in a plane substantially parallel to the working direction of the tooth and the lower portion being twisted transversally thereof so that the bottom edge of the tooth shall be substantially in the vertical plane of the top portion of said tooth.

2. As a new article of manufacture, a flat metal tooth for a cultivator implement comprising, a substantially rectangular shaped body portion, the lateral edges of the top portion being in a plane substantially parallel to the working direction of the tooth and the lower portion being twisted approximately at right angles thereto so that the point formed at the leading bottom edge of the tooth shall lie substantially in the vertical plane of the top portion of said tooth.

3. In a cultivator, the combination with a frame, of a plurality of flat metal teeth secured thereto, each tooth comprising a substantially rectangular shaped body portion, the lateral edges of the top portion being in a plane substantially parallel to the working direction of the tooth and the lower portion being twisted transversally thereof so that the point formed at the leading bottom edge shall lie substantially in the vertical plane of the top portion at the frame, and means for securing the teeth to the frame.

4. As a new article of manufacture, a cultivator implement comprising, a flat metal frame, a row of flat metal teeth forming an integral part of said frame and depending therefrom, the lateral edges of each tooth at the frame being in a plane substantially parallel to the working direction of the tooth and the lower portion being twisted transversally thereof so as to provide a tooth having a variable soil working surface extending throughout the length of the tooth, the bottom of each tooth sloping downwardly and forwardly to provide a substantially V-shaped soil engaging edge.

5. As a new article of manufacture, a cultivator implement comprising, a flat metal frame, and a row of depending flat metal teeth struck downwardly from the frame, the lateral edges of each tooth at the frame being in a plane substantially parallel to the working direction of the implement, and the lower portion of each tooth being twisted transversally thereof so that the bottom edge of the tooth shall be substantially in the vertical plane of the upper portion of the tooth at the frame.

6. A cultivator implement of the character described comprising, a triangular shaped flat metal frame, and rows of flat metal teeth struck downwardly from the frame on the two converging sides thereof, the lateral edges of each tooth at the frame being in a plane substantially parallel to the working direction of the implement, and the lower portion of each tooth being twisted transversally thereof so that the bottom edge of the tooth shall lie substantially in the vertical plane of the top portion of the tooth at the frame.

7. A cultivator of the character described in claim 6 including, a leader tooth depending from the apex of the converging sides of the frame, said tooth being angular in shape and having side portions extending in a plane substantially parallel to the rows of teeth formed at the sides of the frame.

8. The method of forming a cultivator implement which comprises, providing a flat metal blank having spaced marginal projections on the opposite sides thereof, bending the projections downwardly to form a frame support and rows of teeth having their upper portions parallel to the working direction of the implement and at right angles to the frame, and twisting the lower portion of each tooth transversally thereof so that the bottom edge of the tooth shall lie substantially in the vertical plane of the tooth at the support.

9. In a cultivator, the combination with a frame, of a plurality of flat metal teeth depending therefrom, each tooth comprising a substantially rectangular shaped body portion, the lateral edges of the top portion being in a plane substantially parallel to the working direction of the tooth, and the lower portion being twisted transversally thereof so that the point formed at the leading bottom edge shall lie substantially in the vertical plane of the top portion of the tooth at the frame.

FRED E. JENNY.